United States Patent
Kang et al.

(10) Patent No.: US 7,420,693 B2
(45) Date of Patent: Sep. 2, 2008

(54) PAPER CARTRIDGE FOR PRINTER

(75) Inventors: Sung-wook Kang, Seoul (KR); Yeong-eek Yoo, Uiwang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 926 days.

(21) Appl. No.: 10/298,558

(22) Filed: Nov. 19, 2002

(65) Prior Publication Data

US 2003/0107780 A1 Jun. 12, 2003

(30) Foreign Application Priority Data

Dec. 11, 2001 (KR) ................................ 2001-78272

(51) Int. Cl.
- H04N 1/04 (2006.01)
- G06F 15/00 (2006.01)
- G06K 1/00 (2006.01)
- G06K 15/00 (2006.01)
- B65H 3/52 (2006.01)
- B65H 1/08 (2006.01)
- B65H 3/24 (2006.01)
- B65H 9/04 (2006.01)

(52) U.S. Cl. .................. 358/1.12; 358/495; 358/1.1; 271/121; 271/124; 271/126; 271/129; 271/142; 271/243; 271/117

(58) Field of Classification Search ................ 400/629, 400/624; 358/498, 1.12; 271/118, 121, 124, 271/126, 128, 129, 142, 243, 245, 164, 167, 271/117

See application file for complete search history.

(56) References Cited

U.S. PATENT DOCUMENTS

| | | | | |
|---|---|---|---|---|
| 5,622,364 | A * | 4/1997 | Dutton et al. | 271/117 |
| 5,775,823 | A * | 7/1998 | Bekki et al. | 400/629 |
| 7,108,259 | B2 * | 9/2006 | Chang | 271/121 |
| 7,156,388 | B2 * | 1/2007 | Kang et al. | 271/121 |
| 2002/0008348 | A1 * | 1/2002 | Inoue et al. | 271/10.11 |
| 2005/0017429 | A1 * | 1/2005 | Park | 271/8.1 |
| 2005/0023744 | A1 * | 2/2005 | Okamoto | 271/121 |
| 2005/0040588 | A1 * | 2/2005 | Chang | 271/126 |

FOREIGN PATENT DOCUMENTS

JP 07330183 A * 12/1995

* cited by examiner

Primary Examiner—Kimberly A Williams
(74) Attorney, Agent, or Firm—Staas & Halsey LLP

(57) ABSTRACT

A paper cartridge of a printer including a cartridge body to load papers to be picked up, and a friction plate to provide a predetermined friction force to a front end of the papers picked up at the cartridge body. The friction plate is sloped at a predetermined angle in the body so that the friction plate can be moved by being pushed by the front end of the paper.

16 Claims, 4 Drawing Sheets

PAPER CARTRIDGE FOR PRINTER

CROSS-REFERENCE TO RELATED APPLICATIONS

This application claims the benefit of Korean Application No. 2001-78272, filed Dec. 11, 2001, in the Korean Industrial Property Office, the disclosure of which is incorporated herein by reference.

BACKGROUND OF THE INVENTION

1. Field of the Invention

The present invention relates to a paper cartridge for a printer, and more particularly, to a paper cartridge for a printer capable of loading papers to be used to print and distribute the papers one by one by being removably installed at the printer.

2. Description of the Related Art

Usually, a printer such as a photocopying machine or a laser printer has a paper cartridge to load papers to be picked up into a printer body. The paper cartridge is removably disposed at the printer body, and the papers loaded in the paper cartridge are fed one by one by a pick up unit.

Referring to FIG. 1, the paper cartridge is installed in a paper cartridge body 10 so that the paper P can be loaded to a predetermined height. A friction plate 11 is disposed in the body 10 at a predetermined angle.

In the above structure, a pick roller 15 pushes away the paper P in a direction A by contacting the uppermost sheet of paper. Then, the front of the uppermost sheet of paper contacts the friction plate 11, and the uppermost sheet of paper is separated from the remainder of the loaded papers P by a friction force of the friction plate 11. The papers P slide up the friction plate 11 and are picked up one by one.

However, the paper cartridge of the conventional printer having the above structure encounters problems when feeding different types of paper. For example, when thick papers are loaded in the cartridge body 10, friction between the end of the friction plate 11 and the paper front is too great. Thus, the thick paper cannot be picked up normally, but is instead pushed and crumpled. A similar problem occurs when the paper P is too wide.

SUMMARY OF THE INVENTION

Accordingly, it is an object of the present invention to overcome the above-mentioned problems of the related art.

It is a further object of the present invention to provide an improved paper cartridge of a printer which feeds paper easily by altering a contact angle of the paper and a pick up guide surface.

Additional objects and advantages of the invention will be set forth in part in the description which follows and, in part, will be obvious from the description, or may be learned by practice of the invention.

The foregoing and other objects of the present invention are achieved by providing a paper cartridge of a printer, including a cartridge body to load papers, and a friction plate to provide a predetermined friction force to a front end of the papers picked up at the cartridge body, the friction plate being sloped at a predetermined angle in the cartridge body so that the friction plate is moved by being pushed by the front end of the papers.

According to an aspect of the present invention, the paper cartridge of the printer further includes a spring to flexibly support the friction plate and return the friction plate moved by being pushed by the picked up paper.

Moreover, a sloping support part is further disposed being sloped at a predetermined angle in the cartridge body so that the friction plate can be supported while being sloped.

According to another aspect of the present invention, an end of the friction plate is fixed at a lower end of the sloping support part and can be elastically changed by an outer force, and an upper end of the friction plate is movably connected with an upper end of the sloping support part.

According to still another aspect of the present invention, a plurality of friction plates are disposed in the cartridge body at a predetermined interval.

According to still another aspect of the present invention, the spring and the friction plate are paired with each other and a plurality of these elements are disposed at a predetermined interval. The plurality of springs have different spring forces from each other, and a spring having a lowest relative spring force is disposed at a center of the cartridge.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
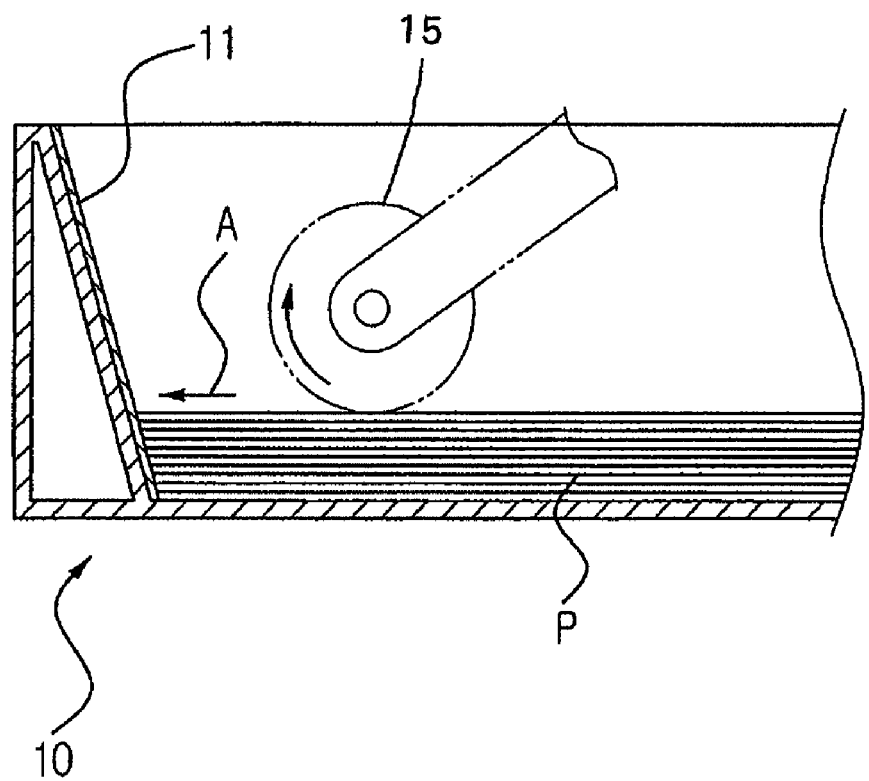
FIG. 1 is a partial end view showing a paper cartridge of a conventional printer.

Reference will now be made in detail to the present preferred embodiments of the present invention, examples of which are illustrated in the accompanying drawings, wherein like reference numerals refer to like elements throughout.

Figure 2:
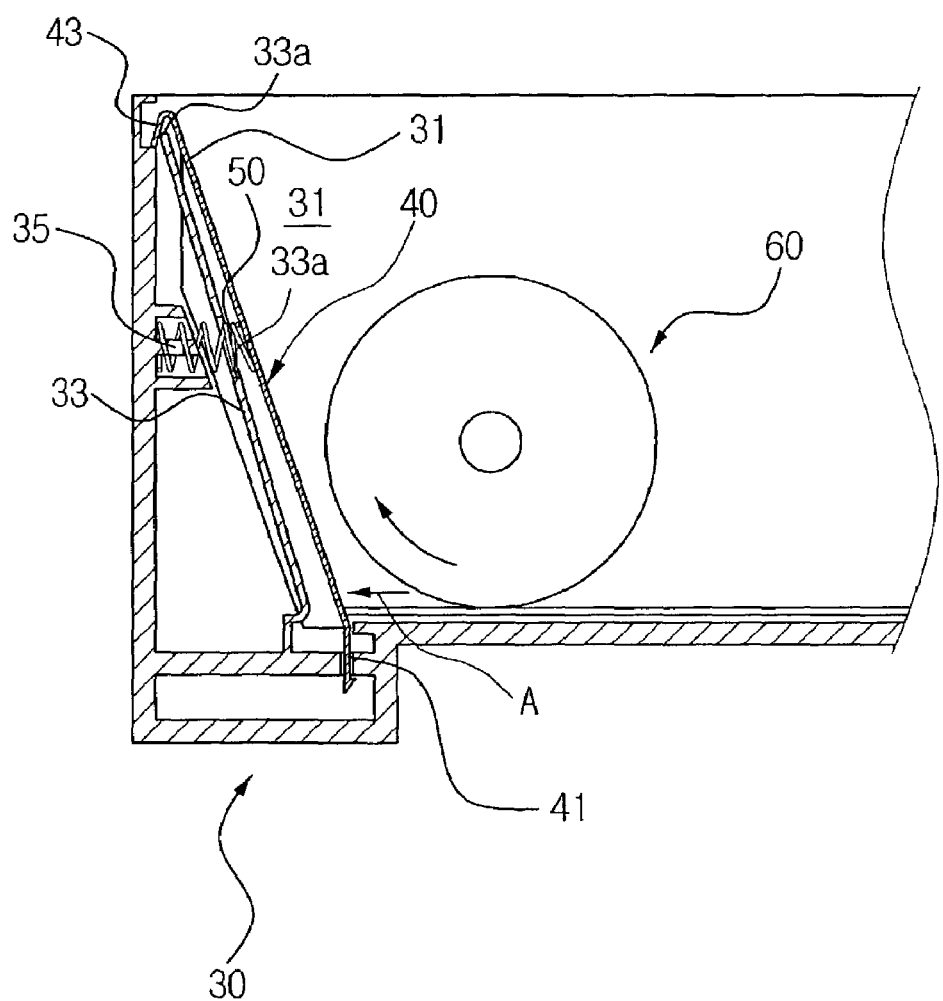
FIG. 2 is a schematic end view showing a paper cartridge of a printer according to an embodiment of the present invention.

Referring to FIG. 2, the paper cartridge of the printer according to the present invention includes a cartridge body 30 having a paper loading part 31 to load papers P, a friction plate 40 disposed in the cartridge body 30, and a spring 50.

The cartridge body 30 is removably installed at a printer body of a printer such as a laser printer or a photocopying machine. The paper P loaded in the paper loading part 31 of the cartridge body 30 is picked up by a pick-up unit 60 and sheets of the paper P are fed one by one. A sloping support part 33, sloped at a predetermined angle, is disposed at a side wall in the cartridge body 30. The side wall corresponds to a front end of the picked up paper. The sloping support part 33 is integrally formed with the cartridge body 30.

The friction plate 40 has a rough side so that a friction force is provided to the front end of the paper P picked up by the cartridge body 30. Moreover, the friction plate 40 is disposed within the cartridge body 30 so that the friction plate 40 can be moved by being pushed by the front end of the paper P. Thus, the friction plate 40 is movably installed at the sloping support part 33. In other words, a lower end 41 of the friction plate 40 is fixed at a lower end of the sloping support part 33, and an upper end 43 of the friction plate 40 is inserted into a connect hole 33a formed at an upper part of the sloping support part 33. The lower end 41 of the friction plate 40 can be flexibly changed by a force, when the friction plate 40 is pushed away by the front end of the paper P in a direction A.

The upper end 43 of the friction plate 40 is formed as a loop shape and is movably inserted into the connect hole 33a.

The spring 50 is disposed between the friction plate 40 and the body 30. A boss 35 supports the spring 50 and is disposed in the body 30. Furthermore, a spring hole 33b allows the spring 50 to pass therethrough and is formed in the sloping support part 33. The spring 50 returns the friction plate 40, which is pushed by the picked up paper and corrects the angle as the spring 50 flexibly supports a rear side of the friction plate 40.

Figure 3:
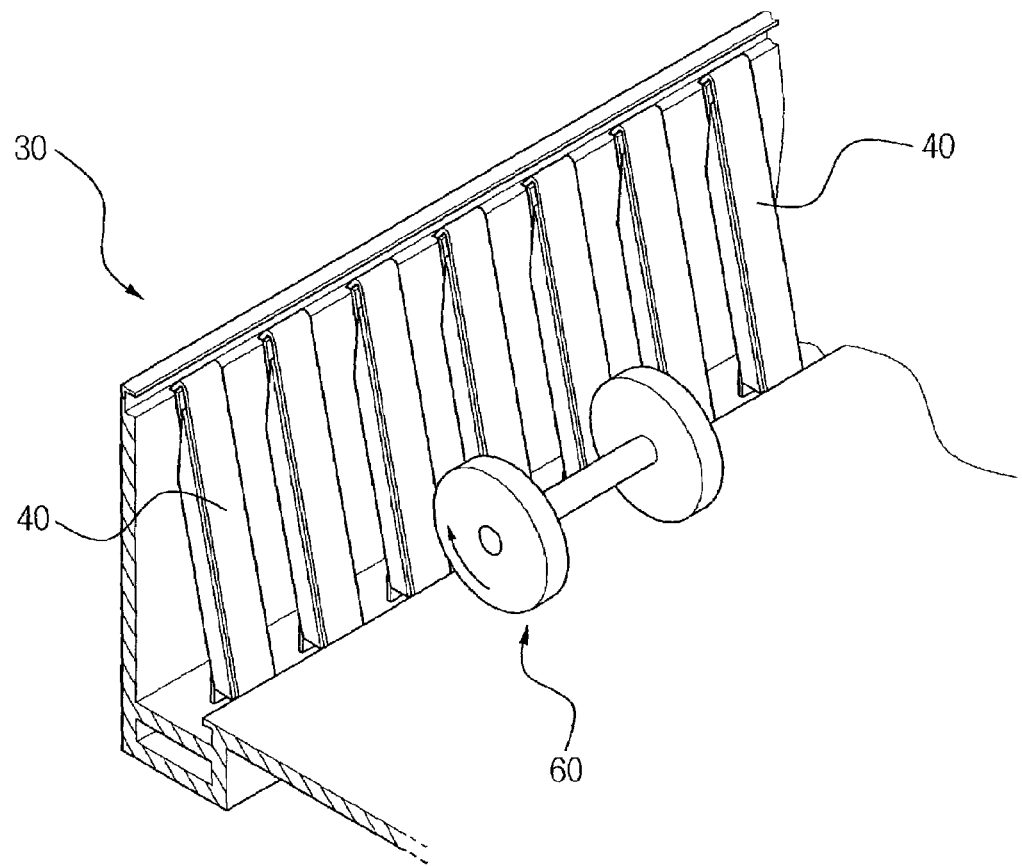
FIG. 3 is perspective view showing the paper cartridge shown in FIG. 2.

As shown in FIG. 3, plural friction plates 40 are installed in the cartridge body 30 at a predetermined interval. Thus, plural ones of the springs 50 are also disposed corresponding to the plural friction plates 40. In this case, it is advisable that a small spring having relatively less elastic force than the other springs is disposed at a center to prevent a center of the front end of the picked up paper from being damaged.

In the case of the paper cartridge of the printer according to this embodiment of the present invention, when normal papers are loaded and fed, the pushing force of the front end is weak. Therefore, although the angle of the friction plate 40 is small, the papers can be easily separated and picked up one by one.

Figure 4:
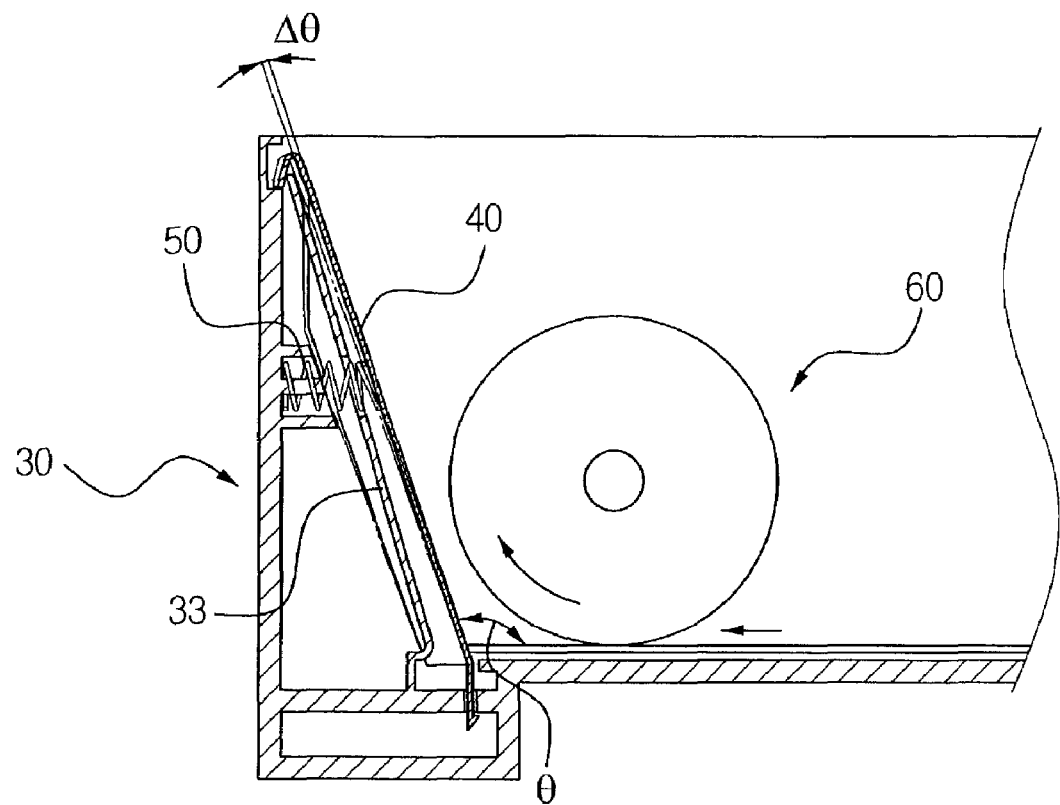
FIG. 4 is a partial end view showing a moved friction plate shown in FIG. 2.

On the other hand, when thick papers and wide papers are fed, the pushing force of the front end of the papers is relatively large. Therefore, in this case, the friction plate 40 is pushed backward at a predetermined angle (θ) as shown in FIG. 4. Then, the contact angle θ between the front end of the paper and the friction plate 40 becomes wider by Δθ, thus the resistance to the front end of the paper is less. Accordingly, even though thick papers or wide papers are fed, the papers are separated and picked up and fed one by one. Therefore, when the thick papers are fed, the papers are prevented from being crumpled or from not being picked up. In the meantime, after all of the papers are fed, the friction plate 40 returns to its initial position by the elastic force of the spring 50.

The paper cartridge of the printer according to the present invention can change the contact angle between the picked up paper and the friction plate. Therefore, when thick papers or wide papers are fed, the papers can be fed easily by changing the resistance between the friction plate and the front end of the papers, and also the problems of the papers being crumpled and not picked up is solved.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A paper cartridge of a printer, comprising:
a cartridge body to load and pick up papers; and
a friction plate to provide a friction force to a front end of the papers picked up at the cartridge body, the friction plate being sloped at an angle in the cartridge body, wherein the friction plate is moved by being pushed by the front end of the papers,
an angle between a plane of the friction plate and a plane of the papers at a time of initial contact between the friction plate and the papers being closer to a perpendicular angle than a parallel angle.

2. The paper cartridge of the printer of claim 1, further comprising a spring to flexibly support the friction plate and return the friction plate to an original position after being moved by being pushed by the papers.

3. The paper cartridge of the printer of claim 2, further comprising:
a plurality of the springs disposed at a predetermined interval; and
a plurality of the friction plates corresponding to the plurality of springs.

4. The paper cartridge of the printer of claim 3, wherein each of the plurality of springs has a different spring force, and the spring having a lowest spring force is disposed at a center of the paper cartridge.

5. The paper cartridge of the printer of claim 1, further comprising a sloping support part disposed within the cartridge body at a predetermined angle to support the friction plate.

6. The paper cartridge of the printer of claim 5, wherein the sloping support part comprises upper and lower ends, and the friction plate comprises upper and lower ends, wherein the lower end of the friction plate is fixed to the lower end of the sloping support part and is elastically changed by an external force, and the upper end of the friction plate is movably connected to the upper end of the sloping support part.

7. The paper cartridge of the printer of claim 6, wherein the upper end of the sloping support part comprises a connect hole formed therein, and the upper end of the friction plate has a loop shape and is movably inserted into the connect hole.

8. The paper cartridge of the printer of claim 1, further comprising a plurality of the friction plates disposed within the cartridge body at a predetermined interval.

9. The paper cartridge of the printer of claim 1, further comprising a roller, spaced from the friction plate, to pick up the papers.

10. A cartridge of a printer to pick up papers loaded therein, comprising:
a cartridge body; and
a friction plate disposed within the cartridge body and sloped at a varying angle relative to the cartridge body while the cartridge body remains stationary in accordance with a force of the papers on the friction plate,
an angle between a plane of the friction plate and a plane of the papers at a time of initial contact between the friction plate and the papers being closer to a perpendicular angle than a parallel angle.

11. The cartridge of the printer of claim 10, further comprising a pickup unit to move the papers from the cartridge body to the friction plate and thereby provide the force of the papers on the friction plate.

12. A printer comprising:
a printer body; and
a paper cartridge to load papers into the printer body, the paper cartridge comprising:
a cartridge body to load and pick up the papers, and
a friction plate to provide a friction force to a front end of the papers picked up at
the cartridge body, the friction plate being sloped at an angle relative to the cartridge body and being moved by being pushed by the front end of the papers,
an angle between a plane of the friction plate and a plane of the papers at a time of initial contact between the friction plate and the papers being closer to a perpendicular angle than a parallel angle.

13. A method of loading papers from a printer cartridge having a cartridge body and a friction plate disposed in the cartridge body, to a printer body, the method comprising:
moving the papers from the cartridge body against the friction plate; and
adjusting an angle of the friction plate relative to the cartridge body in accordance with a force of the papers against the friction plate, an angle between a plane of the friction plate and a plane of the papers at a time of initial contact between the friction plate and the papers being closer to a perpendicular angle than a parallel angle.

14. A paper cartridge of a printer, comprising: a cartridge body to load and pick up papers; a friction plate to provide a friction force to a front end of the papers picked up at the cartridge body; a support which enables a change of a contact angle between the picked up paper and the friction plate according to a characteristic of the paper, an angle between a plane of the friction plate and a plane of the papers at a time of initial contact between the friction plate and the papers being closer to a perpendicular angle than a parallel angle; wherein the support is an elastic member which moves in response to a force of the picked up paper on the friction plate.

15. A paper cartridge of a printer, comprising: a cartridge body to load and pick up papers; a friction plate to provide a friction force to a front end of the papers picked up at the cartridge body; a support which enables a change in the friction force between the picked up paper and the friction plate according to a characteristic of the paper, an angle between a plane of the friction plate and a plane of the papers at a time of initial contact between the friction plate and the papers being closer to a perpendicular angle than a parallel angle; wherein the support is an elastic member which moves in response to a force of the picked up paper on the friction plate.

16. A paper cartridge of a printer to pick up papers, comprising:
    a friction plate to provide a friction force to a front end of the papers, an angle between a plane of the friction plate and a plane of the papers at a time of initial contact between the friction plate and the papers being closer to a perpendicular angle than a parallel angle,
    wherein the friction plate is moved by being pushed by respective front ends of the papers.

* * * * *